(12) United States Patent
Ruppert et al.

(10) Patent No.: US 7,021,722 B2
(45) Date of Patent: Apr. 4, 2006

(54) SYSTEM FOR AND METHOD OF BRAKING A VEHICLE

(75) Inventors: Rex L. Ruppert, Benson, MN (US); Keith M. Ricke, Willmar, MN (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/880,835

(22) Filed: Jun. 30, 2004

(65) Prior Publication Data

US 2006/0001313 A1     Jan. 5, 2006

(51) Int. Cl.
*B60T 13/74*     (2006.01)
(52) U.S. Cl. .................. 303/2; 303/9.62; 303/9.66; 188/170; 188/349
(58) Field of Classification Search .............. 303/9.62, 303/9.66, 9.74, 2; 137/504, 115.11
See application file for complete search history.

(56) References Cited

U.S. PATENT DOCUMENTS

| | | | |
|---|---|---|---|
| 1,030,357 A | | 6/1912 | Wagenhals |
| 1,312,648 A | | 8/1919 | Taussig |
| 2,199,785 A | | 5/1940 | Dickson |
| 3,838,887 A | | 10/1974 | Stelzer |
| 3,899,049 A | | 8/1975 | Martin |
| 3,912,031 A | | 10/1975 | Goulet |
| 3,957,315 A | * | 5/1976 | Cummins et al. .......... 303/9.76 |
| 4,273,218 A | | 6/1981 | Morris et al. |
| 4,407,549 A | | 10/1983 | Klein |
| 4,428,621 A | * | 1/1984 | Taki et al. ..................... 303/13 |
| 4,934,760 A | | 6/1990 | Myers |
| 5,099,875 A | * | 3/1992 | Smietana ..................... 137/504 |
| 5,141,086 A | * | 8/1992 | Kaneda ....................... 188/195 |
| 5,222,787 A | * | 6/1993 | Eddy et al. .................... 303/10 |
| 5,295,736 A | * | 3/1994 | Brearley ........................ 303/7 |
| 5,474,144 A | * | 12/1995 | Tarng ........................... 180/76 |
| 5,950,772 A | | 9/1999 | Buckley et al. |
| 6,375,281 B1 | * | 4/2002 | Angerfors .................... 303/176 |
| 6,401,882 B1 | * | 6/2002 | Ueda et al. .............. 188/264 G |

FOREIGN PATENT DOCUMENTS

JP     11-30252 A   *   2/1999

* cited by examiner

*Primary Examiner*—James McClellan
*Assistant Examiner*—Mariano Sy
(74) *Attorney, Agent, or Firm*—Rebecca Hentel

(57) ABSTRACT

The invention relates to a brake system configured to enhance control and maneuverability of a three-wheeled agricultural applicator. The brake system includes a brake pedal in fluid communication with a rear brake system and a front brake system. The front brake system includes a flow limiter in communication with a brake actuator configured to delay application of a second braking force by the front brake system relative to application of a first braking force by the rear brake system. The front brake system includes a front brake mechanism comprising a caliper assembly in combination with a disc brake configured to apply the second braking force to the at least one front wheel assembly. The caliper assembly employs a spacer combined with a series of bushings to float the caliper assembly in general alignment with movement of the disc brake caused by dynamic forces associated with operation of the vehicle.

19 Claims, 4 Drawing Sheets

SYSTEM FOR AND METHOD OF BRAKING A VEHICLE

FIELD OF THE INVENTION

The invention relates to a system for and a method of braking a vehicle and, more particularly, relates to an agricultural applicator employing a front brake system configured to enhance control and maneuverability of the agricultural applicator.

BACKROUND OF THE INVENTION

Numerous types of agricultural applicators are available today. These can include a pull-type unit or a self-propelled unit. A certain known agricultural applicator is also referred to as a "floater." The floater is a large vehicle that uses large, oversized floatation tires to carry the vehicle across firm to muddy agricultural environments. The chassis assembly of the floater generally includes three or more floatation tires. One particular chassis assembly includes a pair of rear floatation tires and a single front floatation tire. The chassis assembly is configured to support one or more bulk storage tanks or bins of product for application in an agricultural environment, usually before planting in the spring or after harvest in the fall. The types of agricultural products, e.g., fertilizer, herbicide, pesticide, nutrients, etc., can vary. The floater can also be utilized to tow various agricultural implements. The oversize-tired agricultural applicators are generally desired for their ability to maneuver heavy loads over extremely rough and difficult agricultural terrain with minimal soil compaction.

However, these floater-type agricultural applicators have drawbacks. For example, a typical floater includes a front non-driving floatation wheel mounted on a fork assembly and a pair of rear-driving floatation wheels. Only the rear-driving wheel assemblies are configured with a brake system (i.e., a rear brake system). Floater-type agricultural applicators are known to be difficult to brake and maneuver, especially when carrying a partial or full load of product. Although not recommended, known floater-type agricultural applicators are even more difficult to brake and maneuver on a paved roadway. More specifically, the floater's rear brake system is unable to slow and/or stop the floater-type agricultural applicator in a satisfactory manner to meet transportation safety standards (e.g., American Society of Agricultural Engineers (ASAE), etc.). Therefore, there is a need for enhanced maneuverability and braking control of floater-type agricultural applicators.

U.S. Pat. No. 4,934,760 discloses a hydraulic vehicle brake system having a front brake mechanism at each front wheel assembly, and a rear brake mechanism at each rear wheel assembly. Each front and rear brake mechanism receives pressurized hydraulic fluid at an identical time and pressure from a hydraulic control device. Each front and rear brake mechanism further includes a timing control that employs a spring system biased to oppose a brake fluid pressure to engage the front and rear brake systems. A first spring system is associated with each front wheel assembly and a second spring system is associated with each rear wheel assembly. The first spring system is constructed with a greater size or number of springs so as to provide a greater bias force than the second spring system. The second spring system thus facilitates engagement of each rear brake mechanism before the first spring system engages each front brake mechanism.

A drawback of this type of certain known brake system is that a timing control is required at the brake mechanism at each front and rear wheel assembly. Furthermore, the lower bias force of the front spring system reduces the applied braking force by the front brake system below its full potential. Thus, there is a need for an agricultural applicator (e.g., floater) brake system and method that provides a braking force at both the front and rear wheel assemblies without the use of timing control spring systems at each wheel assembly, and without disrupting the balance of the vehicle. There is a further need for a brake system for use on a floater-type agricultural applicator that will reduce skidding and enhance maneuverability of the floater-type agricultural applicator on both agricultural fields and paved surfaces. Moreover, it is further desired that such a brake system meet predetermined braking standards (e.g., American Society of Agricultural Engineers (ASAE), etc.).

SUMMARY OF THE INVENTION

The present invention provides a system for, and a method of, braking an agricultural applicator that meets the desires and needs described above. The brake system of the present invention thus enhances control and maneuverability of the agricultural applicator on both agricultural terrain and paved surfaces.

In a first embodiment of the present invention, a brake system for a vehicle having at least one front wheel assembly and at least one rear wheel assembly is provided. The brake system includes a brake pedal configured such that actuation of the brake pedal causes the brake system to apply a vehicular braking force. The brake system further includes a rear brake system and a front brake system. The rear brake system is configured to apply a first braking force, or first portion of the total vehicular braking force, to the at least one rear wheel assembly in response to actuation of the brake pedal. The front brake system is configured to subsequently exert a second braking force, or second portion of the total vehicular braking force, on the front wheel assembly. The front brake system includes a flow limiter operable to cause application of the second braking force by the front brake system to the at least one front wheel assembly subsequent to application of the first braking force by the rear brake system to the at least one rear wheel assembly.

A preferred embodiment of the brake system is for use with a three-wheeled agricultural applicator having a fork assembly supported on a shaft-mounted wheel. The rear brake system is pneumatically-driven while the front brake system is hydraulically-driven. For example, in response to actuation of the brake pedal, a fluid flow is transmitted to both the rear and front brake systems. In response to the fluid flow, the rear brake system applies the first braking force to the rear wheel assemblies. In contrast, the front brake system is more complex and includes a flow limiter and a brake actuator. The brake actuator is configured to transmit a hydraulic pressure or a hydraulic flow to a front brake mechanism. The flow limiter limits the fluid flow to the brake actuator, thereby causing a predetermined time delay after exertion of the first braking force by the rear brake system. After the predetermined time delay, the brake actuator provides the hydraulic flow or pressure that causes the front brake mechanism to apply the second braking force to the front wheel assembly.

The front brake mechanism preferably includes a caliper assembly in combination with a disc brake. The caliper assembly includes a first caliper, a second caliper, and a spacer disposed therebetween. Each end of the spacer preferably includes a pair of openings, configured to receive a bushing (or sleeve) and a shaft of washers. One end of the shaft is coupled to a reinforcement plate fixed on either side of the fork assembly. The spacer and bushings allow the caliper assembly to "float" or move with a deflection in the shaft of the front wheel assembly caused by dynamic forces associated with operation of the vehicle.

In another embodiment, the present invention provides a vehicle that includes a chassis assembly in support of a cab for an operator, a drive unit, at least one front wheel assembly and a pair of rear wheel assemblies. The drive unit is configured to drive the pair of rear wheel assemblies. The vehicle further includes a brake system configured to exert a braking force on the vehicle. The brake system includes a brake pedal disposed in the cab and in communication with a rear brake system and a front brake system. Actuation of the brake pedal transmits a fluid flow to the rear and front brake systems. In response to actuation of the brake pedal and the fluid flow, the rear brake system applies a first braking force to the pair of rear wheel assemblies. Also, in response to actuation of the brake pedal, the front brake system applies a second braking force to the at least one front wheel assembly. The front brake system is preferably hydraulically-driven. The front brake system includes a flow limiter configured to delay application of the second braking force for a predetermined time interval following application of the first braking force by the rear brake system to the rear wheel assemblies.

The present invention also provides a method of braking a vehicle having at least one front wheel assembly and at least one rear wheel assembly. A brake system is configured to apply a braking force to the vehicle in response to actuation of a brake pedal, the brake system including a rear brake system configured to apply a first brake force to at least one wheel assembly, and a front brake system having a front brake mechanism configured to apply a second brake force to the at least one front wheel assembly. The method of braking preferably includes the steps of: actuating the brake pedal; applying the first braking force with the rear brake system to the at least one rear wheel assembly; and applying a second braking force with the front brake system to the at least one front wheel assembly, the second braking force being subsequent to the first braking force by a predetermined time delay. In a preferred embodiment of the method in accordance with the invention, the second braking force applied by the front brake system is smaller relative to the first braking force applied by the rear brake system. Additionally, the brake pedal is preferably interconnected with a pneumatic system to provide a pneumatic flow to the front and the rear brake systems. The step of delaying engagement of the second braking force preferably includes delaying engagement of the front brake mechanism with the front wheel assembly by limiting the pneumatic flow to a brake actuator. The brake actuator in combination with a hydraulic source is operable to provide a hydraulic flow and/or pressure to the front brake mechanism in response to the pneumatic flow. The step of delaying engagement of the front brake mechanism includes limiting the pneumatic flow to the actuator so as to create a predetermined time delay after application of the first braking force by the rear brake system; and activating the brake actuator to provide the hydraulic flow and/or pressure to cause engagement of the front braking mechanism following the predetermined time delay. The preferred step of engaging the front brake mechanism with the at least one front wheel assembly includes providing the hydraulic flow and/or pressure to a caliper assembly which works in combination with a disc brake so as to cause the front brake mechanism to exert a braking torque on the at least one front wheel assembly.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of vehicles could be constructed in accordance with the invention defined by the claims. Hence, while preferred embodiments of the invention will now be described with reference to a three-wheeled agricultural applicator, it should be understood that the invention is in no way so limited. The type of vehicle (e.g., recreational vehicle, earthmover, motorcycle, etc.) can vary.

Figure 1:
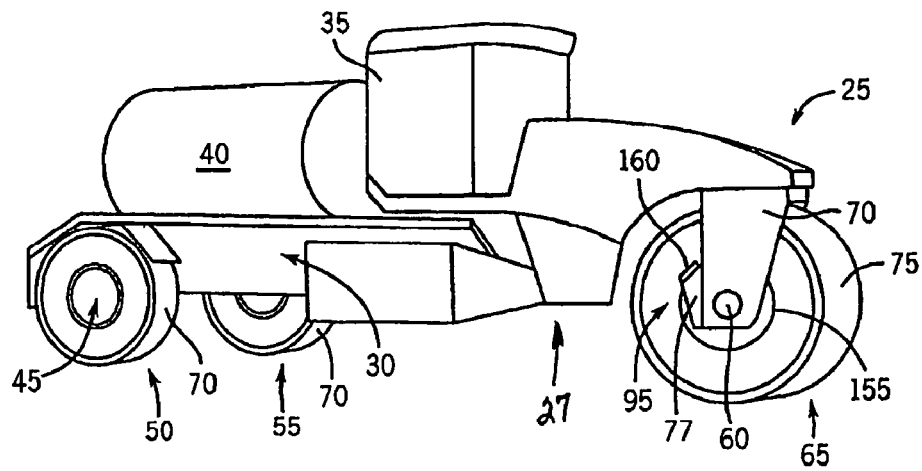
FIG. 1 illustrates an agricultural applicator in accordance with the present invention.

Referring to FIG. 1, a brake system (discussed later) in accordance with a first embodiment of the present invention is combined with an agricultural applicator. The preferred agricultural applicator shown is a conventional agricultural applicator herein referred to as a "floater" 25. The floater 25 is a type of agricultural applicator commonly used to apply crop nutrients or animal or human waste (sludge) to soils, typically before planting in the spring and/or after harvest in the fall.

The floater 25 generally includes a chassis assembly 27 having a frame 30 and a plurality of wheel assemblies in support of a cab 35 and a bulk storage tank 40. The bulk storage tank 40 typically contains agricultural product such as liquid fertilizer or dry fertilizer for application in an agricultural environment.

FIG. 1 shows a preferred embodiment of the floater 25 with a chassis assembly 27 having a rear axle 45 mounted with a pair of rear wheel assemblies 50 and 55, and a front axle or shaft 60 in support of a front wheel assembly 65. Even though the preferred embodiment of chassis assembly of the floater 25 is shown with three wheel assemblies 50, 55, and 65, the number of wheel assemblies (e.g., a two-wheeled machine, a four-wheeled machine, etc.) can vary. The frame 30 includes a front fork assembly 70 configured to mount the front shaft 60 and associated front wheel assembly 65. The front wheel assembly 65 typically is centrally mounted on the front shaft 60.

Each of the wheel assemblies 50, 55, 65 of the floater 25 typically employs oversized floatation tires 75, which are configured to carry the floater 25 across agricultural terrain that can vary from firm to soft, tilled, and sometimes muddy agricultural environments. The floatation tires 75 of the wheel assemblies 50, 55, 65 are typically very wide, e.g. 43 inches, and thus the floater 25 typically does not include suspension for the front wheel assembly 67. Without front suspension, large dynamic loads associated with operation of the floater 25 are transmitted to the front fork assembly 70 and front shaft 60. These large dynamic loads (e.g., a floater 25 is known to carry loads up to 14,000 pound loads through rough terrain and/or mud) can cause deflection in the front shaft 60.

To avoid debris from contaminating operation of the front wheel assembly 65, the front fork assembly 70 is configured to be as tight as possible and yet wide enough to let the mud pass and not build up. Reinforcement plates 77 are coupled to the front fork assembly 70 to enhance the strength of the front fork assembly 70. Accordingly, the front fork assembly 70 is able to handle the dynamic forces associated with braking the floater 25 when fully-loaded or partially-loaded.

Figure 3:
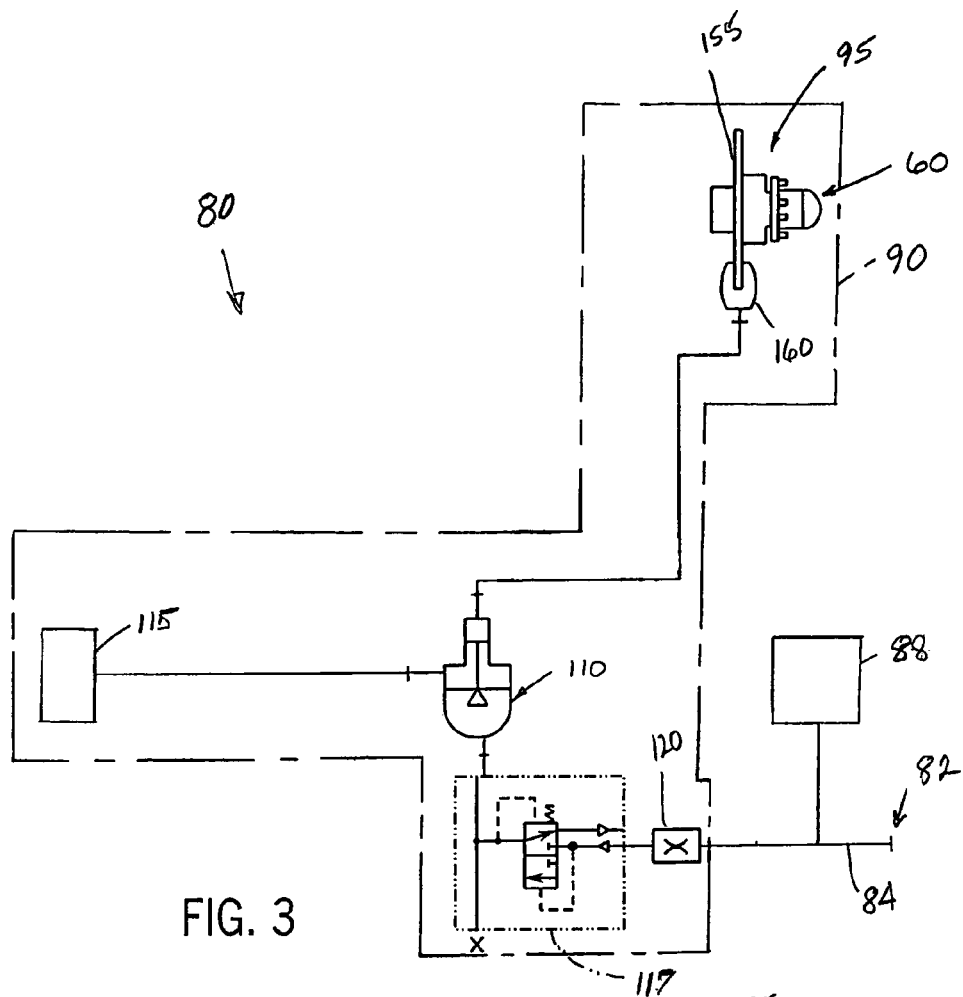
FIG. 3 illustrates a schematic diagram of a front brake system in accordance with the present invention.
Figure 4:
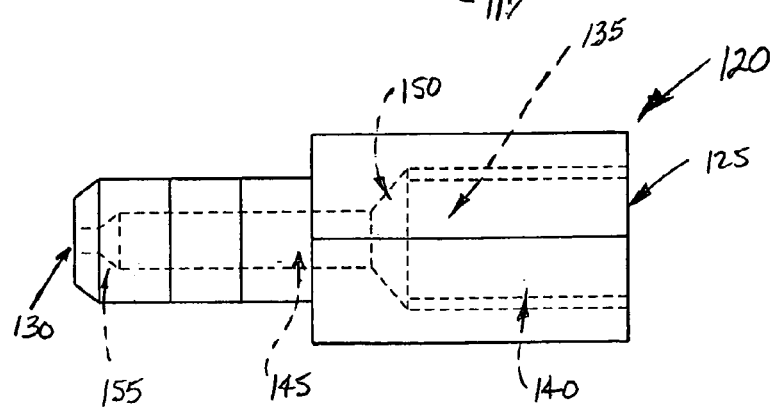
FIG. 4 illustrates a detailed view of a flow limiter as shown in FIG. 3.

FIG. 3 illustrates a schematic diagram of a preferred embodiment of a brake system 80 of the floater 25. The preferred brake system 80 includes a brake pedal or lever 82 in communication via a pneumatic system 84 with a rear brake system 88. The rear brake system 88 is pneumatically-driven to engage and apply a first braking force to the rear wheel assemblies 50 and 55 to control maneuvering and speed of the floater 25. In a partially-loaded or fully-loaded condition, sole engagement of the rear brake system 88 may lock-up the rear wheel assemblies 50 and 55.

Still referring to FIG. 3, the brake system 80 is further equipped with a front brake system 90. The front brake system 90 is configured to enhance maneuverability and control of the floater 25 on both agricultural terrain as well as on paved surfaces. More specifically, the front brake system 90 is configured to reduce skidding or sliding of the front wheel assembly 65 when braking the floater 25 to a stop or when braking to maneuver a corner or turn. The front brake system 90 thus allows the floater 25 to avoid undesired out-of-control skids and/or the ripping out of vegetation or crops. In addition, the front brake system 90 is configured to accommodate and move with deflection associated with dynamic loading on the front shaft 60.

Still referring to FIG. 3, the preferred front brake system 90 of the present invention is hydraulically-driven. The front brake system 90 includes a front brake mechanism 95 associated with the front wheel assembly 65, and a brake actuator 110 in communication with a hydraulic source or reservoir 115. The brake actuator 110 can be mounted at either side of the frame 30 of the floater 25 for ready access and service. The pneumatic system 84 interconnects the brake pedal 82 to the rear brake system 88 and to the brake actuator 110 of the front brake system 90. When an operator actuates the brake pedal 82 to engage the front brake system 90, a pneumatic flow is transmitted to the brake actuator 110 of the front brake system 90 as well as to the rear brake system 88. In response to the pneumatic flow, the brake actuator 110 provides a hydraulic fluid flow and/or pressure in a known manner to the front brake mechanism 95 at the front wheel assembly 65. The hydraulic flow and/or pressure causes the front brake mechanism 95 to engage and apply a second braking force to the front wheel assembly 65. The front brake system 90 further includes a quick release valve 117. Upon releasing the brake pedal 82, the quick release valve 117 is operable to release the air volume and/or pressure at the brake actuator 110. In response, the front braking mechanism 95 disengages from applying the second braking force to the front wheel assembly 65.

The preferred brake actuator 110 includes a master cylinder operable in a known manner to provide the hydraulic flow and/or pressure to engage the brake mechanism 95 when braking the front wheel assembly 65. Upon transmission of the desired flow or volume of air to activate the brake actuator 110, the brake actuator 110 in combination with the hydraulic fluid source 115 provides the hydraulic flow and/or pressure to engage the front brake mechanism 95. Although the preferred embodiment of the front brake system 90 is described as hydraulically-driven, the type (e.g., hydraulic, pneumatic, etc.) of front brake system 90 can vary and is not limiting on the invention. Furthermore, the type of brake actuator 110 can vary.

As illustrated in FIG. 3, the front brake system 90 further includes a flow limiter 120 disposed upstream of the brake actuator 110. A preferred flow limiter 120 defines an orifice having an inlet 125 and an outlet 130 and a passage 135 extending therebetween. The inlet 125 is of a cross-sectional area that is larger relative to a cross-sectional area of the outlet 130. The passage 135 includes a first portion 140 having the cross-sectional area of the inlet 125. The first portion 140 communicates with a second portion 145, with a first transitional portion 150 located therebetween. A cross-sectional area of the second portion 145 is smaller relative to the cross-sectional area of the first portion 140. The second portion 145 of the passage 135 communicates with the outlet 130, with a second transitional portion 155 therebetween. The cross-sectional area of the second portion 145 is larger relative to the cross-sectional of the outlet 130. The lengths, diameters, and cross-sectional areas of the inlet 125, outlet 130, passage portions 140 and 145, and transitional portions 150 and 155 can vary.

The above configuration of the flow limiter 120 is operable to limit the pneumatic flow or flow rate of air transmitted to the brake actuator 110. By limiting the pneumatic flow rate of air, the flow limiter 120 delays engagement of the front brake mechanism 95 (e.g., the "second braking force") subsequent to the engagement of the rear brake system 88 (e.g., the "first braking force"). The sequential timing of the engagement of the rear brake system 88 with the rear wheel assemblies 50 and 55 before the engagement of the front brake mechanism 95 with the front wheel assembly 65 reduces the stopping distance associated with braking the floater 25.

Figure 2:
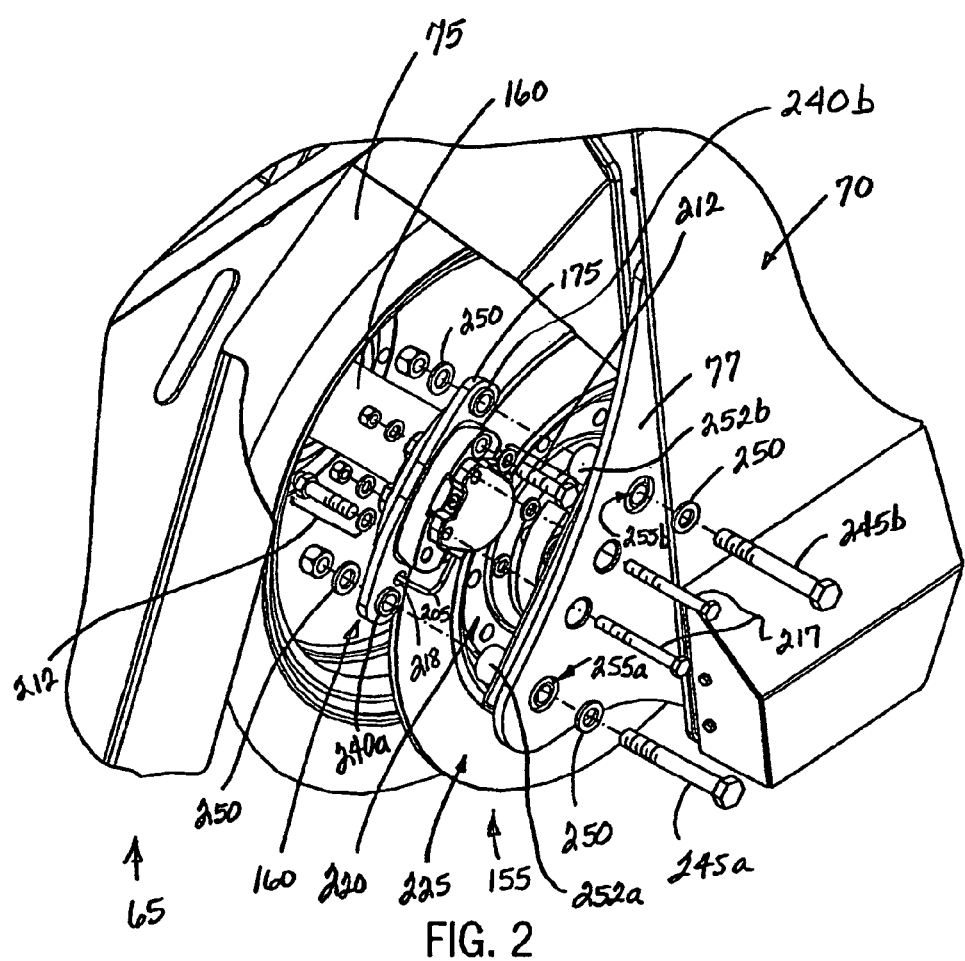
FIG. 2 shows an exploded view of a front wheel assembly of FIG. 1, in combination with a front brake mechanism in accordance with the present invention.

Referring to FIG. 2, it can be seen that the preferred front brake mechanism 95 is a disc brake 155 in combination with a caliper assembly 160. The caliper assembly 160 in combination with the disc brake 155 is configured to apply the second braking force to the front wheel assembly 65. The caliper assembly 160 is mounted to the front fork assembly 70. The disc brake 155 is fixed to rotate with the front tire 75 and the front shaft 60 mounted on the front fork assembly 70. The caliper assembly 160 is preferably mounted vertically upward and to the rear relative to the front shaft 60, preferably at approximately a 45-degree angle relative to horizontal.

At this location, the caliper assembly 160 avoids contamination with dirt and mud associated with typical operation of the floater 25. Furthermore, the caliper assembly 160 can be readily serviced at this location. Still furthermore, this location allows the caliper assembly 160 to be essentially hidden from view and therefore aesthetically enhances the floater 25. However, as an alternative to the caliper assembly 160, the front brake system 90 can include a drum brake mechanism (not shown) configured to fit inside the front wheel assembly 65. But, the preferred disc brake 155/caliper assembly 160 of the present invention is disposed at a position that is more readily serviceable and less susceptible to contamination.

Figure 6:
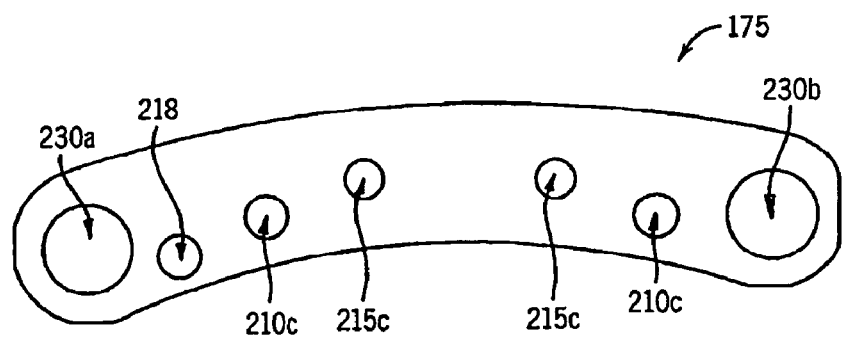
FIG. 6 illustrates a detailed perspective view of a spacer shown in FIG. 5.
Figure 5:
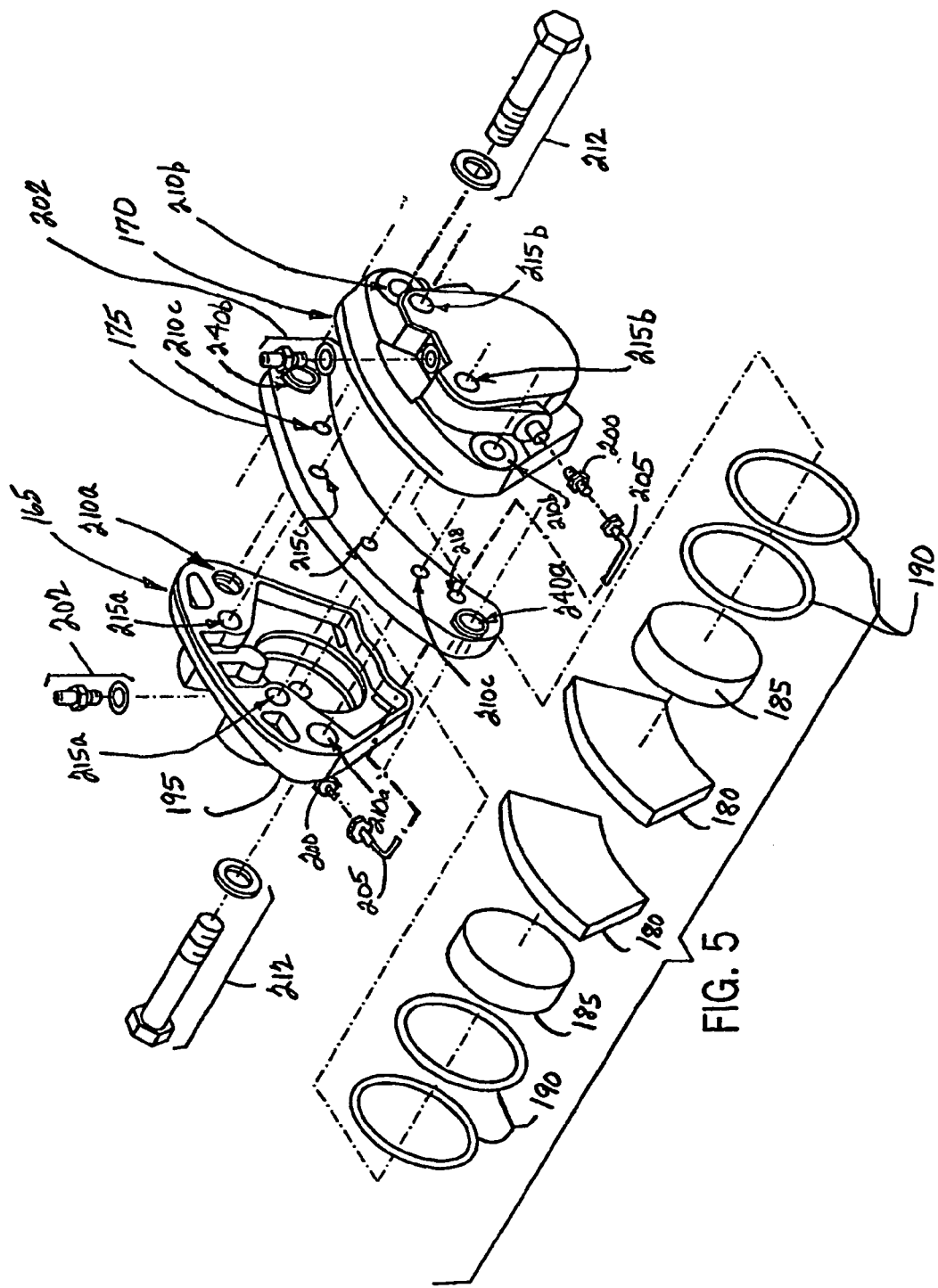
FIG. 5 shows an exploded view of a caliper assembly as shown in FIG. 2.

As illustrated in FIGS. 5 and 6, the preferred disc brake 155/caliper assembly 160 is a heavy-duty, double-piston disc brake/caliper assembly operable to exert about 100,000 inch-pounds (±5%) of deceleration torque on the front wheel assembly 65 so as to provide a predetermined stopping distance desired for the floater 25. To enhance control of the floater 25, the preferred disc brake 155/caliper assembly 160 is configured to exert a second braking force (or second portion of the total vehicular braking force) on the front wheel assembly 65 that is less than the first braking force (or first portion of the total vehicular braking force) exerted by the rear brake system 88 on the rear wheel assemblies 50, 55. A preferred front braking force contributes approximately 20% (±5%) of the total braking force or braking power exerted on the floater 25. The rear brake system 88 thus remains the significant braking source for slowing or stopping the floater 25.

FIG. 5 illustrates a preferred caliper assembly 160 having a first caliper 165 disposed opposite a second brake caliper 170, and a spacer 175 coupled therebetween. Calipers 165 and 170 each include a brake pad 180, a disc 185, O-rings 190, and a housing portion 195 generally known in the art. Hydraulic couplings 200, a bleed valve 202, and hydraulic tubing 205 are configured to receive and communicate hydraulic fluid and/or pressure from the brake actuator 110 to each caliper 165 and 170. Calipers 165 and 170 and the spacer 175 include openings 210a, 210b, and 210c, respectively, configured to receive fasteners 212 (e.g., bolts, washers, nuts, etc.) coupling together the caliper assembly 160 typically prior to attachment of the caliper assembly 160 to the reinforcement plate 77 of the fork assembly 70. Calipers 165 and 170 and spacer 175 each further include mounting openings 215a, 215b, and 215c, respectively, configured to receive fasteners 217 (e.g., bolts, washers, nuts, etc.) that also couple together the caliper assembly 160, except typically installed after the caliper assembly 160 is attached to the reinforcement plate 77 of the fork assembly 70.

FIG. 2 illustrates a preferred disc brake 155 of the present invention. The preferred disc brake 155 includes a central boss portion 220 and an outer rim portion 225. The central boss portion 220 is of a depth configured to space the outer rim portion 225 apart from a hub of the tire 75 of the front wheel assembly 65. The disc brake 155 is of increased diameter in order to enhance the braking force necessary to achieve the desired braking torque to achieve a predetermined transportation braking standard (e.g., ASAE, etc.). Yet, the size of the caliper assembly 160 and the disc brake 155 can vary.

Referring to FIGS. 2, 5 and 6, the influence of dynamic forces associated with operation of the floater 25 causes deflection in the front shaft 60 of the front wheel assembly 65. This deflection of the front shaft 60 can cause movement of the disc brake 155 that can result in undesired binding with the caliper assembly 160. To accommodate this deflection of the front shaft 60 and associated movement of the disc brake 155, the preferred caliper assembly 160 is configured to move or "float." Referring to FIGS. 5 and 6, the spacer 175 of the caliper assembly 160 includes boreholes 230a and 230b disposed at opposite ends of the spacer 175 and outside the limits of the calipers 165 and 170. The boreholes 230a and 230b include bushings or sleeves 240a and 240b inserted therein configured to receive a pair of hardened shafts 245a and 245b (e.g., bolts). The shafts 245a and 245b are mounted with a series of washers 250. The shafts 245a and 245b extend through another pair of bushings 252a and 252b disposed in openings 255a and 255b in the reinforcement plate 77, thereby mounting the caliper assembly 160 to the reinforcement plate 77 of the fork assembly 70. The spacer 175 and attached caliper assembly 160 is thus operable to float on the bushings 240a, 240b inserted in the boreholes 230a, 230b in general alignment with the disc brake 155 in response to deflection in the front shaft 60. When the caliper assembly 160 is in general alignment with the outer rim portion 225 of disc brake 155, the calipers 165, 170 apply approximately equal force against the disc brake 155 at approximately the same time. The "floating" caliper assembly 160 thus avoids undesired binding of the front brake system 90 with the front wheel assembly 65.

In operation of the present invention, an operator engages the brake pedal 82 to the engage the brake system 80 of the floater 25. In response to actuation of the brake pedal 82, a pneumatic flow is provided to the front brake system 90 and the rear brake system 88. In response the pneumatic flow associated with actuation of the brake pedal 82, the rear brake system 88 applies a first braking force to the pair of rear wheel assemblies 50 and 55. The flow limiter 120 limits the pneumatic flow rate to the brake actuator 110, thereby delaying engagement of the front brake mechanism 95 for a pre-determined time period following application of the first braking force by the rear brake system 88. After the build-up of the predetermined pneumatic volume is transmitted by the flow limiter 120 to activate the brake actuator 110, the brake actuator 110 in combination with the hydraulic source 115 transmits a hydraulic fluid flow and/or pressure that causes the front brake mechanism 95 to apply the second braking force to the front wheel assembly 65.

More specifically, the brake actuator 110 transmits the hydraulic flow and/or pressure to the caliper assembly 160 of the front brake mechanism 95 until the build-up of hydraulic pressure causes the first and second calipers 165 and 170 to squeeze together and engage opposite sides of the outer rim portion 225 of the disc brake 155. The engagement of the brake pads 180 of each first and second caliper 165 and 170 against the disc brake 155 generates a rotational braking torque, or the second braking force, on the front wheel assembly 65. The first braking force applied by the rear brake system 88 on the rear wheel assemblies 50 and 55 and the delayed second braking force applied by the front brake mechanism 95 of the front brake system 90 to the front wheel assembly 65 slows the floater 25 to a controlled speed or stop. Such application of the first and second braking forces by the braking system 80 allows the operator to maneuver or stop the floater 25 in a controlled manner. In a preferred embodiment, the predetermined time delay between initial engagement of the rear brake system 88 with the rear wheel assemblies 50 and 55 and the subsequent engagement of the front brake mechanism 95 with the front wheel assembly 65 is approximately 0.5 to 1.0 seconds. The caliper assembly 160 is preferably sized (e.g., pressure, diameter) to prevent the front brake system 90 from locking-up the front wheel assembly 65 during quick stops, straight travel, or while turning. Thereby, the front brake system 90 reduces the undesired occurrence of an out-of-control skid.

Accordingly, the front brake system 90 of the present invention enhances the maneuverability and control of the floater 25. Because the front brake system 90 applies the second braking force to the front wheel assembly 65 after a predetermined time delay following application of the first braking force by the rear brake system 88, the operator is able to more readily control and maneuver the floater 25 to a stop or to turn a corner while still allowing the capacity to carry large loads of agricultural product. The front brake system 90 of the present invention also provides shorter stopping distance relative to a floater having only the rear brake system 88. In short, the control and maneuverability of the agricultural vehicle is enhanced.

When accelerated to 15.5 miles per hour (mph), empirical tests show that an unloaded floater-type agricultural applicator equipped with the braking system 80 of the present invention is operable to stop within a desired predetermined distance of 21-feet relative to the applicator's position at initiation of the brake pedal 82. In doing so, the front brake system 90 exerts a braking torque without locking-up the front tire 75. When accelerated to 15.5 mph and carrying a load exceeding 25,000 pounds, the floater 25 equipped with the brake system 80 of the present invention is operable to stop within a desired predetermined distance of 28-feet. With wet brakes and carrying the same 25,000-pound load, the floater 25 equipped with the brake system 80 exhibited a stopping distance within 46-feet. These results surpass desired braking distances in accordance with the American Society of Agricultural Engineers ASAE S365 standard.

One skilled in the art will recognize that the present invention is not limited to the agricultural applicator. The present invention can be used to brake numerous types of mobile machines or vehicles (e.g., recreational vehicles, etc.) having at least one rear wheel assembly and at least one front wheel assembly. In particular, the present invention is also applicable to numerous types of mobile vehicles or machines (e.g., motorcycles, etc.) having a single rear wheel assembly and a single front wheel assembly. Furthermore, although a mobile vehicle is shown with a rear-wheel drive, it is understood that the present invention is applicable to vehicles having a front-wheel drive and is not limiting on the invention. It is also understood that although a brake pedal is disposed in a cab that when actuated engages the brake system, numerous types of brake actuators (e.g., pedals, levers, etc.) can be employed at various locations on the vehicle.

Many changes and modifications could be made to the invention without departing from the spirit thereof. The scope of these changes will become apparent from the appended claims.

We claim:

1. A vehicle, comprising:
   a drive unit;
   a cab;
   a chassis assembly in support of the cab and the drive unit, the chassis assembly including at least one front wheel assembly and a pair of rear wheel assemblies, the drive unit configured to drive the pair of rear wheel assemblies; and
   a brake system, the brake system comprising:
      a brake pedal disposed in the cab, the brake pedal configured to be actuated by an operator to engage the brake system;
      a rear brake system configured to apply a first braking force to the pair of rear wheel assemblies in response to actuation of the brake pedal, the rear brake system being pneumatically-driven; and
      a front brake system configured to apply a second braking force to the at least one front wheel assembly in response to actuation of the brake pedal, the front brake system being hydraulically-driven, the front brake system including a flow limiter configured to cause the second braking force to be applied to the front wheel assembly subsequent to application of the first braking force by the rear brake system to the pair of rear wheel assemblies.

2. The vehicle as recited in claim 1, wherein actuation of the brake pedal releases a fluid flow to the front and rear brake systems, wherein the at least one front wheel assembly includes a front wheel mounted on a front shaft, and wherein the front brake system further comprises:
   a hydraulic source configured to provide a hydraulic flow;
   a disc brake coupled to the front wheel;
   a caliper assembly operable to engage the disc brake; and
   a brake actuator in communication with the hydraulic source, the brake actuator operable to provide the hydraulic flow to the caliper assembly,
   wherein in response to the hydraulic flow from the brake actuator, the caliper assembly in combination with the disc brake applies the second braking force to the at least one front wheel assembly.

3. The vehicle as recited in claim 2, wherein the second braking force applied by the caliper assembly and the disc brake to the at least one front wheel assembly is approximately 100,000 inch-pounds of deceleration torque.

4. The vehicle as recited in claim 2, further including at least one front fork assembly configured to support the at least one front wheel assembly and associated front brake mechanism, the front fork assembly comprising:
   a fork mounted on the front shaft, the disc brake coupled between the front wheel and the fork; and
   a reinforcement plate connected to the fork, the caliper assembly mounted on the reinforcement plate.

5. The vehicle as recited in claim 4, wherein the disc brake is fixed to the front wheel, the disc brake including an inner portion and an outer portion, the inner portion being recessed relative to the outer portion, and wherein the outer portion of the disc brake is spaced apart from the front wheel along the front shaft and configured to be engaged by the caliper assembly.

6. The vehicle as recited in claim 4, wherein the caliper assembly further comprises:
   a first caliper and a second caliper, the first caliper disposed opposite the second caliper with the disc brake disposed therebetween, the first and second calipers each including a brake pad configured to engage the disc brake in response to the hydraulic flow from the brake actuator;
   a spacer coupled between the first and second calipers, the spacer including a first opening and second opening each disposed at opposed ends of the spacer and outside the first and second calipers;
   a first bushing and a second bushing disposed in the first and second openings, respectively; and
   a first shaft and a second shaft inserted through the first and second bushings, respectively, the first and second shafts each coupled to the reinforcement plate,
   wherein the first and second calipers and the spacer therebetween float on the first and second bushings in general alignment with the disc brake in response to deflection in the front shaft of the at least one front wheel assembly.

7. A brake system for a vehicle having at least one front wheel assembly and at least one rear wheel assembly the brake system including a brake pedal configured such that actuation of the brake pedal causes engagement of the brake system, the brake system comprising:

a rear brake system configured to apply a first braking force to the at least one rear wheel assembly in response to actuation of the brake pedal; and a front brake system configured to apply a second braking force to the at least one front wheel assembly in response to actuation of the brake pedal, the front brake system including a flow limiter operable to cause application of the second braking force to the at least one front wheel assembly subsequent to application of the first braking force by the rear brake system to the at least one rear wheel assembly, wherein the caliper assembly comprises:

a first caliper having a first housing portion and a first brake pad;

a second caliper having a second housing portion and a second brake pad, the second brake pad opposed to the first brake pad with the disc brake disposed therebetween;

a spacer removably disposed between the first and second calipers, the spacer having a first and a second opening each disposed at opposed ends of the spacer and radially outward relative to the first and second housing portions of the first and second calipers, respectively;

a first and a second bushing inserted in the first and second openings, respectively, in the spacer; and a first and a second shaft each having a first end and a second end, the first ends of the first and second shafts connected to a fork assembly, the first and second shafts extending through the first and second bushings in the first and second openings of the spacer, respectively, wherein the caliper assembly floats on the first and second bushings in general alignment with the disc brake in response to deflection in the front shaft of the at least one front wheel assembly.

8. The brake system as recited in claim 7, wherein the disc brake is connected to the front wheel of the at least one front wheel assembly, the disc brake being spaced apart from the front wheel of the at least one front wheel assembly, and wherein the caliper assembly is mounted on the front fork assembly.

9. The vehicle as recited in claim 7, wherein the disc brake includes an inner portion and an outer portion, the inner portion being recessed a predetermined distance relative to the outer portion, the inner portion being fixed adjacent to the front wheel, and the outer portion of the disc brake being spaced apart from the front wheel along the front shaft of the at least one front wheel assembly, and wherein the caliper assembly engages the outer portion of the disc brake to apply the second braking force to the at least one front wheel assembly.

10. A method of braking a vehicle, the vehicle including at least one front wheel assembly and at least one rear wheel assembly, the vehicle further including a brake system having a brake pedal configured to release a fluid flow to a rear brake system and a front brake system, the method comprising the steps of:

actuating the brake pedal;

transmitting a fluid flow to the front and rear brake systems in response to actuation of the brake pedal;

applying a first braking force by the rear brake system to the at least one rear wheel assembly in response to the fluid flow;

limiting the fluid flow to the front brake system; and applying a second braking force by the front brake system to the at least one front wheel assembly in response to the fluid flow, wherein applying the second braking force occurs subsequent to applying the first braking force by the rear brake system to the at least one rear wheel assembly, wherein the rear brake system is pneumatically-driven and the front brake system is hydraulically-driven, and wherein the transmitted fluid flow to the front and rear brake systems is a pneumatic flow, the front brake system comprising:

a brake actuator in combination with a hydraulic source to regulate a hydraulic flow to a front brake mechanism, wherein the step of limiting the fluid flow to front brake system includes limiting the pneumatic flow to the brake actuator.

11. The method as recited in claim 10, wherein the first braking force applied by the rear brake system to the at least one rear wheel assembly is less than the second braking force applied by the front brake system to the at least one front wheel assembly.

12. The method as recited in claim 10, wherein the front brake mechanism further comprises a caliper assembly in combination with a disc brake operable to provide the second braking force to the at least one front wheel assembly, the step of applying the second braking force by the front brake system comprising:

activating the brake actuator in response to the pneumatic flow;

transmitting the hydraulic flow from the brake actuator to the front brake mechanism;

engaging the caliper assembly against the disc brake in response to the hydraulic flow from the hydraulic source; and exerting a braking torque on the at least one front wheel assembly.

13. A brake system for a vehicle having at least one front wheel assembly and at least one rear wheel assembly, the brake system including a brake pedal configured such that actuation of the brake pedal causes engagement of the brake system, the brake system comprising:

a rear brake system configured to apply a first braking force to the at least one rear wheel assembly in response to actuation of the brake pedal; and a front brake system configured to apply a second braking force to the at least one front wheel assembly in response to actuation of the brake pedal, the front brake system comprising:

a flow limiter operable to cause application of the second braking force to the at least one front wheel assembly subsequent to application of the first braking force by the rear brake system to the at least one rear wheel assembly, wherein actuation of the brake pedal releases a fluid flow to the front and rear brake systems, a hydraulic fluid source configured to provide a hydraulic flow, a front brake mechanism connected to receive the hydraulic flow from the hydraulic source, and a brake actuator in communication with the hydraulic fluid source, the brake actuator connected to receive the fluid flow associated with actuation of the brake pedal, the brake actuator operable to regulate the hydraulic fluid flow to the front brake mechanism, wherein the rear brake system is pneumatically-driven, and wherein the front brake system is hydraulically-driven, wherein in response to a build-up of a predetermined fluid flow to the brake actuator, and wherein the brake actuator provides the hydraulic flow to reach the front brake mechanism so as to cause the front brake mechanism to apply the second braking force to the at least one front wheel assembly.

14. The brake system as recited in claim 13, wherein the vehicle includes a fork assembly in support of the front wheel assembly and the front brake system, wherein the front wheel assembly includes a front wheel mounted on a front shaft, and wherein the front brake system further comprises:
- a disc brake fixed to rotate with the front wheel of the at least one front wheel assembly; and
- a caliper assembly associated with the disc brake, the caliper assembly and the disc brake configured to apply the second braking force to the at least one front wheel assembly.

15. The brake system as recited in claim 13, wherein application of the second braking force by the front brake system to the at least one front wheel assembly occurs following a predetermined time delay relative to when application of the first braking force by the rear brake system to the at least one rear wheel assembly occurs.

16. The brake system as recited claim 15, further comprising a flow limiter disposed upstream of the brake actuator, and wherein the flow limiter is configured to create the predetermined time delay by limiting the fluid flow rate to the brake actuator.

17. The brake system as recited in claim 16, wherein the flow limiter comprises:
- an inlet in communication with a first passage configured to receive the fluid flow associated with actuation of the brake pedal, the inlet and first passage having a first cross-sectional area;
- a second passage aligned and in communication with the first passage, the second passage having a second cross-sectional area; and
- an outlet in communication the second passage, the outlet having a third cross-9 sectional area, wherein the first cross-sectional area of the inlet and the first passage is larger relative to the second cross-sectional area of the second passage, and wherein the second cross-12 sectional area of the second passage is larger relative to the third cross-sectional area of the outlet.

18. A brake system for a wheel assembly rotatable about a shaft, comprising:
- a caliper assembly configured to engage a disc brake so as to apply a braking force to the wheel assembly, the caliper assembly comprising:
  - a first caliper and a second caliper each including a brake pad configured to engage the disc brake;
  - a spacer removably disposed between the first and second calipers, the spacer including a first opening and a second opening each disposed at opposed ends of the spacer;
  - a first and a second bushing disposed in the first and the second openings, respectively, of the spacer; and
  - a first and a second shaft inserted through the first and second bushings, respectively, wherein the first and second calipers and spacer therebetween float on the first and second bushings in general alignment with the disc brake in response to deflection in the shaft of the wheel assembly.

19. The brake system of claim 18, wherein the shaft of the wheel assembly is supported on a fork assembly of a vehicle, and wherein the first and second shafts of the calliper assembly each include a first end attached at the fork assembly.

* * * * *